June 21, 1966 H. BÄHRING 3,257,573

IMAGE ORTHICON TYPE TUBE HAVING INCREASED SEPARATION BETWEEN DEFLECTING COILS AND STORAGE ELECTRODE, THEREBY IMPROVING RESOLUTION

Filed April 17, 1962 2 Sheets-Sheet 1

Inventor:
Herbert Bähring by Michael S. Striker
Attorney

June 21, 1966 H. BÄHRING 3,257,573

IMAGE ORTHICON TYPE TUBE HAVING INCREASED SEPARATION BETWEEN DEFLECTING COILS AND STORAGE ELECTRODE, THEREBY IMPROVING RESOLUTION

Filed April 17, 1962 2 Sheets-Sheet 2

Jnventor:
Herbert Bähring by Michael J. Striker
Attorney 3,257,573
Patented June 21, 1966

1

3,257,573

IMAGE ORTHICON TYPE TUBE HAVING INCREASED SEPARATION BETWEEN DEFLECTING COILS AND STORAGE ELECTRODE, THEREBY IMPROVING RESOLUTION

Herbert Bähring, Darmstadt, Germany, assignor to Fernseh G.m.b.H., Darmstadt, Germany Filed Apr. 17, 1962, Ser. No. 188,216
Claims priority, application Germany, Apr. 22, 1961, F 33,736
2 Claims. (Cl. 313—65)

Figure 1:
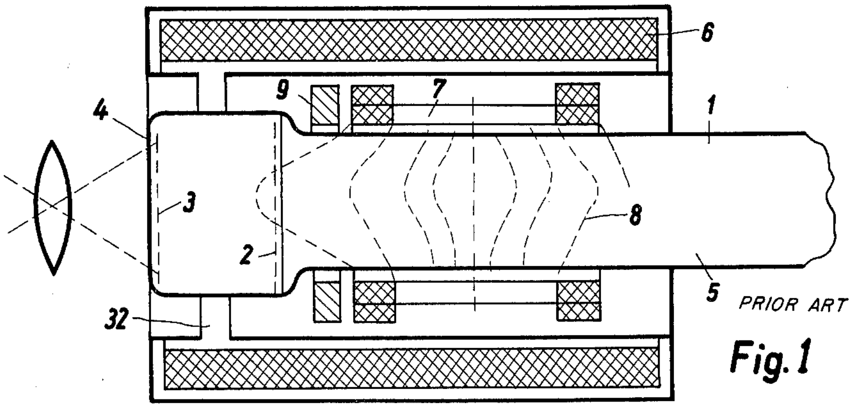

This invention relates to storage cathode ray tube apparatus, that is, to apparatus including a cathode ray tube in which signals are developed by the traversal of an electron beam over a target electrode carrying a pattern of varying electrical charges produced on the electrode by means disposed on the side of the electrode other than that which is scanned by the electron beam. The means for producing the charge pattern may be a further electron beam traversed over the target or may be an electron image focused thereon from a photoelectric cathode. One such cathode ray tube is the television pickup tube such as the supericonoscope or the image orthicon, in which that section of the tube in which an optical image is converted into an electron image and this in turn is used to form a charge image on a target electrode is separate from the scanning section in which an electron beam is developed, is focused upon the target electrode and is deflected to scan the latter in a predetermined pattern. The resolution of the image reproduced from the signal of such a pickup tube depends very substantially upon the extent to which the deflection fields developed in the scanning section can be prevented from entering the image section of the tube; since a deflection field spreading into the image section distorts the stored image. Because of the form of the tube, it is more difficult to achieve an effective spatial separation of the imaging and beam-deflection fields in the image orthicon than in the supericonoscope, since in the image orthicon the sections of the tube are more closely adjacent.

Means for reducing the spread of the deflection fields into the image section have already been proposed. Thus, ferromagnetic rings may be placed around the tube between the deflection coil assembly and the image section, in order to limit the spread of the deflection fields. The deflection coil system may also be surrounded by both a ferromagnetic and an electrostatic screening member in order to prevent the spread of the fields into the image section. Further electrostatic shielding may take the form of an aluminium sheath surrounding the focusing coil but electrically interrupted in the vicinity of the storage electrode, so that eddy currents induced in that part of the sheath which surrounds the deflection coils are prevented from passing into that part of the sheath which surrounds the image space. Even with all these screening arrangements it has not been found possible to obtain from the image orthicon a picture signal in which the depth of modulation at 5 mc./s., expressed as a percentage of that at 0.5 mc./s., exceeded 60%.

The invention arises from the appreciation of the fact that the origin of the residual distortion which results in this degradation of the resolution of the pickup tube lies in components of the deflection field lying in the axial direction of the tube, since these components might be only inadequately screened by the ferromagnetic screening of the coils and pass easily through the ferromagnetic rings into the image section.

According to the present invention there is provided a storage cathode ray tube apparatus comprising means for developing a charge pattern on a storage electrode, means for developing a beam of electrons having a first cross-

2 over, means for focusing said beam on said storage electrode through a plurality of intermediate focal nodes so that at least one of said nodes lies in the space defined by said storage electrode and the ends nearer thereto of a deflection coil system used for deflecting said beam over said storage electrode.

Preferably the distance between the storage electrode and the deflection coil system is substantially equal to twice the internodal distance in the scanning electron beam.

Figure 2:
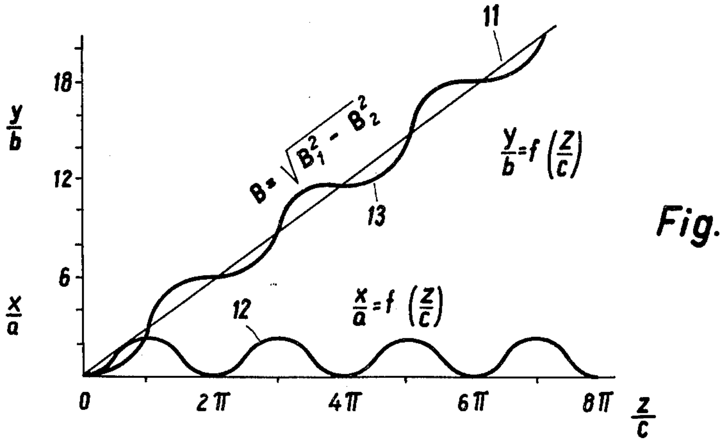
Figure 3:
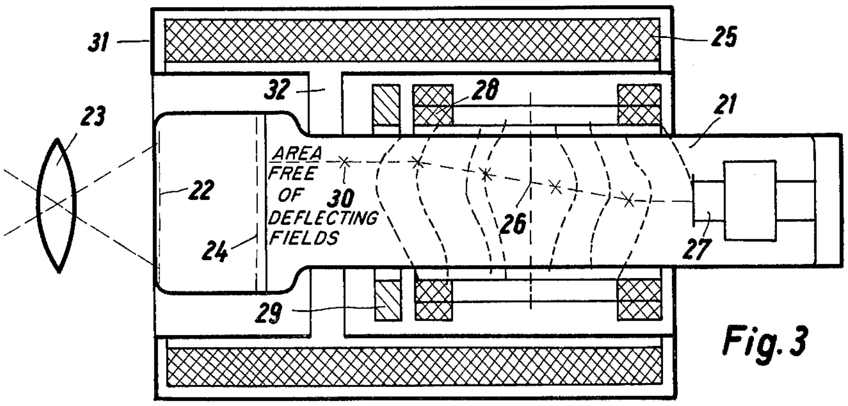
Figure 4:
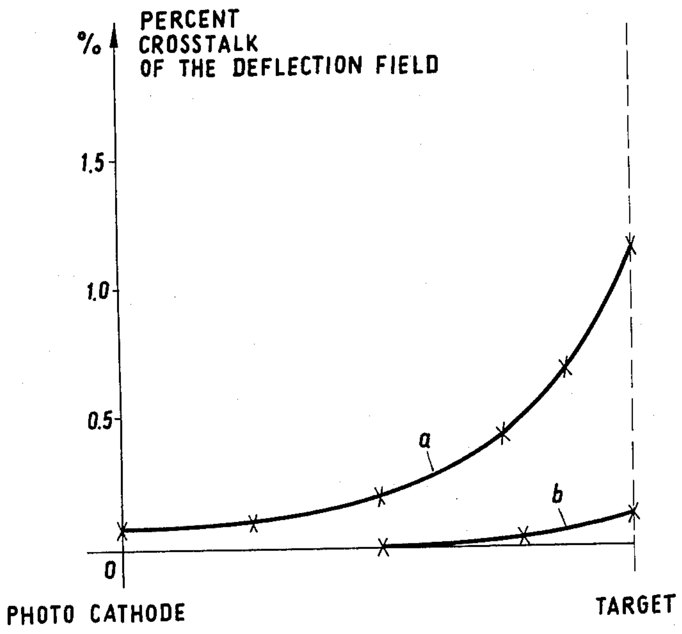

The reasons underlying the present invention and means whereby it may be carried out will now be further described with reference to the accompanying drawings comprising FIGURES 1 to 4, of which:

FIGURE 1 is a schematic sectional elevation of part of a known storage cathode ray tube apparatus, FIGURE 2 is a diagram illustrating the focusing of an electron beam in apparatus of the kind to which the invention relates, FIGURE 3 is a schematic sectional elevation of part of storage cathode ray tube apparatus according to the present invention, and FIGURE 4 is a diagram illustrating the intensity of the stray field in the image converter section of the cathode ray tube.

The storage cathode ray tube shown in FIGURE 1 is an image orthicon, comprising a two-diameter cylindrical glass envelope 1 containing adjacent to the change of diameter a conventional storage electrode 2, upon which electrons emitted from a photocathode 3 disposed on the faceplate of the tube are imaged by the electric and magnetic fields present within the larger-diameter image section 4 of the tube. By means of an electron gun (not shown) disposed within the smaller-diameter scanning section 5 of the tube there is developed an electron beam which is focused upon storage electrode 2 by the axial magnetic field produced by a sole nodal coil 6 which surrounds the whole length of the tube and provides also the magnetic focusing field for the image section. This electron beam is deflected over the storage electrode 2 to scan it in a required pattern by deflecting magnetic fields produced by a deflection coil system 7 surrounding part of the scanning section of the tube. The paths of the lines of force representing this field are indicated by broken lines such as 8.

Although in a practical case the distance from the storage electrode 3 to the nearer end of the deflection coil system may, in the case of a 3-inch image orthicon pickup tube, amount to some 35 mm. or 1⅜ inches, it is found that despite the presence of an annular ferromagnetic shielding member 9 the end fields of the deflection coil system intrude into the image section. This may be proved by withdrawing the deflection coil system 7 from the storage electrode that is, moving to the right in the diagram. It is found that, although the correct area is no longer scanned unless appropriate readjustment of the amplitude of the deflection currents is made, the resolution obtained is thus increased. At the same time, however, a new defect appears, in that the amplitude of the derived signal becomes less for conditions of extreme deflection in either direction than at the centre of the electrode. This is due to a landing error, the scanning beam no longer being incident normally on the storage electrode when fully deflected in either line or frame direction. This error is due to the combined deflection and focusing field present yielding electron paths which are not rectilinear but helical.

The appearance of this defect is illustrated by the diagram given in FIGURE 2 which illustrates the paths of electrons subject to a uniform focusing field $B_1$ in the direction of the $x$ axis and a uniform deflection field $B_2$ in the direction of the $y$ axis, giving rise to a resultant field $B=\sqrt{B_1^2+B_2^2}$ indicated by line 11.

Sinusoidal line 12 shows the variations in value of a function $$\frac{x}{a}=f\left(\frac{z}{c}\right)$$

which represents the path of an electron starting on the $x$ axis and subjected to an accelerating field acting in the $x$ direction to a uniform magnetic field parallel to its general direction of motion. It will be seen that at any focal node, $$\frac{z}{c}=k\cdot 2\pi$$

where $k$ is any integer, the electron is moving parallel to the $x$ axis and is on the axis. The same condition is seen to arise in the case of an electron subjected also to a uniform magnetic field perpendicular to the first. The path of such an electron is represented by sinusoidal line 13, which shows the variations in value of a function $$\frac{y}{b}=f\left(\frac{z}{c}\right)$$

The symbols used in the above paragraph have the following significances:

$$a=\frac{V_0}{\frac{e}{m}\cdot 10^7}\cdot\frac{B_1}{B_1^2+B_2^2}$$

$$b=\frac{V_0}{\frac{e}{m}\cdot 10_7}\cdot\frac{B_1B_2}{(B_1^2+B_2^2)^{3/2}}$$

$$c=\frac{V_0}{\frac{e}{m}\cdot 10^7}\cdot\frac{B_2^2}{(B_1^2+B_2^2)^{3/2}}$$

$$\omega=\frac{e}{m}\cdot 10^7\sqrt{B_1^2+B_2^2}$$

where:

$V$=accelerating voltage in volts $V_0$=electron velocity in cm./sec.$=\sqrt{2V\cdot e/m\cdot 10^7}$ $e/m$=ratio of charge to mass of an electron in cm.$^2$/V sec.$^2$=1.76·10$^8$.

In order for the electron beam to land normally on the storage electrode it is necessary for the electrons to emerge from the deflection field at a focal node. It has therefore been customary hitherto to place the deflection coil system at an effective distance from the target equal to one internodal distance.

In apparatus according to the present invention, however, the distance between the deflection coil system and the storage electrode is increased to two internodal distances, so that one focal node intervenes between the deflection coil system and the storage electrode. By this means it is arranged that the beam lands normally on the target and that the separation of deflection coil system from the image section of the tube is so great that substantially no disturbance of the electrons incident on the storage electrode to develop the stored charges is produced. This allows a television signal to be obtained which has at a frequency of 5 mc./s. an amplitude which is 85% of that at a frequency of 0.5 mc./s. When the photocathode is only momentarily illuminated, so that the degrading effect of the deflection fields is prevented, little if any further improvement is obtained, thus showing that the limiting resolution has been reached.

FIGURE 3 shows apparatus according to the present invention including a conventional image orthicon tube 21, the photocathode 22 of which is illuminated by an optical image projected thereon by a lens 23. Electrons emitted from photocathode 22 are accelerated towards a storage electrode 24 and are focused on that electrode by a magnetic field parallel to the tube axis which is produced by a solenoidal focusing coil 25.

The reverse side of the storage electrode 24 is scanned by an electron beam, indicated by dotted line 26, which is produced by an electron gun 27 and is focused upon the storage electrode by the axial magnetic field of coil 25. The five focal nodes through which the beam passes are indicated by crosses. Electron beam 26 is deflected over storage electrode 24 by the magnetic field produced by a deflection coil system 28, which is partially screened from the image section of the tube by an annular ferromagnetic shielding member 29. In accordance with the invention the deflection coil system is shifted back from the image section, as compared with the former practice, so that the end of the deflection coil system which is nearer to the storage electrode 24 is spaced from it by approximately two internodal distances. Thus, although electrons leave the deflection system at a node a further node 30 intervenes between the deflection system and the storage target. The shielding member 29 may be shifted with the deflection coil system, so that it is now able to prevent the deflection fields penetrating into the image section. It may be seen that focusing coil 25 is surrounded by an aluminium sheath 31 which is interrupted by a gap 32. This gap is shifted further towards the gun 27 as compared with the formerly usual position indicated by reference 32' in FIGURE 1. This modified position of the gap in sheath 31 prevents any spreading towards the image section of eddy currents induced in the sheath by the deflection fields and thus avoids the generation of further disturbing magnetic fields from this cause.

The distance of the storage target from the nearest end of the deflection coil system is thus greater than $x$ and is advantageously equal to $2x$, where $x$ has a value in centimetres which is derived from the equation $$x=\frac{2\pi V_0}{B_2\cdot\frac{e}{m}\cdot 10^7}$$

in which $V_0$ is the velocity in cms./sec. of the electrons in the scanning beam and is equal to $\sqrt{2V\cdot e/m\cdot 10^7}$ where V is the accelerating voltage acting on the electrons, $e/m$ is the value in cm.$^2$/$V$ sec.$^2$ of the ratio of charge to mass of an electron=1.76·10$^8$ and $B_2$ is the magnetic induction at the centre of the focusing coil expressed in $$\frac{\text{volt seconds}}{\text{centimetres}^2}$$

and is equal to $$\frac{ni}{1}\frac{4\pi\cdot 10^{-9}}{\sqrt{\left(\frac{D}{1}\right)^2+1}}$$

FIGURE 4 illustrates the result, which is obtained by adjusting the distance between the target and deflection coils equal to about two nodal lengths. This figure shows diagrammatically the experimental data of the relative crosstalk of the deflection field in the image converter section between photocathode and target. The ordinate shows the relation between the interfering amplitude in the image converter section and the deflection field amplitude at a point of the tube axis surrounded by the deflection coils; the abscissa represents the distance of the measuring point from the photocathode respectively from the target. Curve $d$ shows that near the photocathode the relative field strength of the interfering field is already remarkable and rises to 1.2% near the target. Therefore the photoelectrons are deflected along the whole electron path within the image converter section which causes a decrease of the resolution of the charge pattern on the target. Curve $d$ represents the crosstalk of the deflection field which is obtained when there is the hitherto conventional distance of one nodal length between target and deflection system. Curve $e$ represents the crosstalk of the deflection field which is obtained when according to the present invention a distance of two nodal lengths between target and deflection system is used.

It can be seen from FIGURE 4 very clearly that only a negligible amount of 0.1% of the stray field is effective near the target if said distance is chosen according to the invention. Thus the resolution of the electron image on the target may reach nearly the theoretically possible value which may be obtained when the charge pattern is built up during a suppression period of the deflection field.

What is claimed as new and desired to be secured by Letters Patent is:

1. Cathode ray tube apparatus of the image orthicon type, comprising means for building up a charge pattern on a storage electrode, means for generating and deflecting a beam of electrons having a first crossover, means for focusing said beam on said storage electrode with a plurality of intermediate focal nodes so that one node is at the storage electrode and at least one other node lies in the space between said storage electrode and the ends nearer thereto of the deflection coil system used for deflecting said beam over said storage electrode, the distance in centimetres between said storage electrode and said deflection coil system being substantially greater than the value of $\Delta_z$ given by the equation $$\Delta z=\frac{2\pi V_o}{B^2 \cdot e/m \cdot 10^7}$$

and preferably twice this value, where: $V_o$ is equal to the axial component of the velocity of the electrons in said beam derived from the equation $V_o=\sqrt{2V \cdot e/m \cdot 10^7}$ in which V is the value in volts of the potential applied to said tube to accelerate said electrons and $e/m$ is equal to the ratio of mass to charge of an electron and is $1.76 \cdot 10^8$ cm.$^2/V$ sec.$^2$; and $B_2$ is the intensity of the magnetic focusing field at the centre of the focusing coil derived from the equation $$B^2=\frac{ni}{1}\frac{4\pi \cdot 10^{-9}}{\sqrt{\left(\frac{D}{1}\right)^2+1}}V \text{ sec./cm.}^2$$

where $n$ is the number of turns in said coils, 1 the value in amperes of the current passing through it, and D and 1 are respectively the diameter and length of the coil.

2. Cathode ray tube apparatus of the image orthicon type comprising means for developing a charge pattern on a storage electrode, means for developing a beam of electrons having a first crossover, means for focusing said beam on said storage electrode with a plurality of intermediate focal nodes, comprising a focusing coil surrounding the tube on substantially the axial length thereof, said focusing coil being surrounded by a screen of non-magnetic material, said screen having a gap in its surface covering the interior of said focusing coil, the operational axial magnetic field of the focusing coil being established so that one node is at the storage electrode and at least one of said further nodes lies in the space defined by said storage electrode and the ends nearer thereto of a deflection coil system used for deflecting said beam over said storage electrode, said gap having a position near the said end of said deflection coil system.

References Cited by the Examiner

UNITED STATES PATENTS

| | | | |
|---|---|---|---|
| 2,575,477 | 11/1951 | Weimer | 313—84.3 X |
| 2,579,351 | 12/1951 | Weimer | 313—67 |
| 3,052,809 | 9/1962 | Bahring et al. | 313—65 X |

HERMAN KARL SAALBACH, *Primary Examiner.*

ARTHUR GAUSS, *Examiner.*